US009455575B2

(12) United States Patent
Trainer et al.

(10) Patent No.: US 9,455,575 B2
(45) Date of Patent: Sep. 27, 2016

(54) CONVERTER WITH ACTIVE FAULT CURRENT LIMITATION

(75) Inventors: David Trainer, Alvaston (GB); Colin Donald Murray Oates, Brocton (GB); Colin Charnock Davidson, Stafford (GB); Robert Whitehouse, Stafford (GB)

(73) Assignee: Alstom Technology, Ltd., Baden (CH)

( * ) Notice: Subject to any disclaimer, the term of this patent is extended or adjusted under 35 U.S.C. 154(b) by 1163 days.

(21) Appl. No.: 13/387,698

(22) PCT Filed: Jul. 31, 2009

(86) PCT No.: PCT/EP2009/059980
§ 371 (c)(1),
(2), (4) Date: Apr. 4, 2012

(87) PCT Pub. No.: WO2011/012174
PCT Pub. Date: Feb. 3, 2011

(65) Prior Publication Data
US 2012/0182771 A1     Jul. 19, 2012

(51) Int. Cl.
*H02M 1/32*     (2007.01)
*H02M 7/797*     (2006.01)
(Continued)

(52) U.S. Cl.
CPC ............ *H02J 3/1857* (2013.01); *H02J 3/36* (2013.01); *H02M 1/32* (2013.01); *H02M 7/797* (2013.01); *H02M 2007/4835* (2013.01); *Y02E 40/26* (2013.01); *Y02E 60/60* (2013.01)

(58) Field of Classification Search
CPC ......... H02M 1/32; H02M 2007/4835; H02M 7/797; H02J 3/36; H02J 3/1857; Y02E 60/60; Y02E 40/26
USPC .............................. 363/35, 51, 53, 54, 56.03
See application file for complete search history.

(56) References Cited

U.S. PATENT DOCUMENTS

| 2010/0085785 A1* | 4/2010 | Dommaschk et al. ......... 363/54 |
| 2011/0235375 A1* | 9/2011 | Dommaschk et al. ......... 363/54 |
| 2012/0063181 A1* | 3/2012 | Chimento et al. ......... 363/56.03 |

FOREIGN PATENT DOCUMENTS

| CN | 101258670 | 9/2008 |
| DE | 10103031 | 7/2002 |

(Continued)

OTHER PUBLICATIONS

Baran, M.E., Teleke, S., Bhattacharya, S., Overcurrent Protection in DC Zonal Shipboard Power Systems using Solid State Protection Devices, Electric Ship Technologies Symposium, 2007, ESTS '07, IEEE, May 1, 2007, p. 221-224.

(Continued)

*Primary Examiner* — Fred E Finch, III
*Assistant Examiner* — Jye-June Lee
(74) *Attorney, Agent, or Firm* — Knobbe, Martens, Olson & Bear, LLP

(57) ABSTRACT

A voltage source converter for high voltage DC power transmission is disclosed. According to one aspect, the voltage source converter is connectable between a DC network and another electrical network to interconnect the DC network and the other electrical network. The voltage source converter includes a converter unit configured to convert power flowing between the DC network and the other electrical network and at least one fault unit. One or more of the fault units includes at least one fault module having a voltage source that is operable, in the event of a short circuit in a DC network connected to the voltage source converter, to produce a voltage that acts to reduce current flowing through the voltage source converter and the short circuit.

10 Claims, 7 Drawing Sheets

(51) Int. Cl.
  *H02J 3/18* (2006.01)
  *H02J 3/36* (2006.01)
  *H02M 7/483* (2007.01)

(56) References Cited

FOREIGN PATENT DOCUMENTS

| WO | WO 02/063758 | 8/2002 |
| WO | WO 02063758 A1 * | 8/2002 |
| WO | WO 2010/025758 | 3/2010 |

OTHER PUBLICATIONS

International Search Report dated Aug. 18, 2010 for International Application No. PCT/EP2009/059960, in 4 pages.
Chinese Office Action for Chinese Application No. 200980161154.6 dated Jan. 30, 2014.

* cited by examiner

CONVERTER WITH ACTIVE FAULT CURRENT LIMITATION

RELATED APPLICATIONS

This application is a U.S. National Phase of International Application No.: PCT/EP2009/059980, filed Jul. 31, 2009, which is incorporated by reference in its entirety.

TECHNICAL FIELD

The invention relates to a voltage source converter for use in high voltage direct current (HVDC) power transmission.

BACKGROUND

In HVDC power transmission networks, alternating current (AC) electrical power is typically converted to direct current (DC) power for transmission via overhead lines and/or undersea cables. This conversion means that it is not necessary to compensate for AC capacitive load effects that are otherwise imposed by the transmission line or cable. This in turn reduces the cost per kilometer of the lines and/or cables, and thus conversion of AC power to DC power becomes cost-effective when power needs to be transmitted over a long distance.

The conversion of AC power to DC power is also commonly utilized in power transmission networks in circumstances where it is necessary to interconnect two AC networks operating at different frequencies.

Converters are required at each interface between AC and DC networks to effect the required conversion between AC power and DC power, and one such form of converter is a voltage source converter (VSC).

A DC power grid is also needed to support the emergence of HVDC power transmission. The DC power grid includes DC transmission and distribution networks, which may operate at different voltage levels. In such circumstances a voltage source converter may also be used to interconnect the two DC networks.

During operation of HVDC power transmission networks, voltage source converters may however be vulnerable to DC side faults that present a short circuit with low impedance across the DC power transmission lines or cables. Such faults can occur due to damage or breakdown of insulation, movement of conductors or other accidental bridging between conductors by a foreign object.

The presence of low impedance across the DC power transmission lines or cables is detrimental to a voltage source converter because it can cause current flowing in the voltage source converter to increase to a fault current level many times above its original value. In circumstances where the voltage source converter was only designed to tolerate levels of current below the level of the fault current, such a high fault current damages components of the voltage source converter.

Conventionally, in order to reduce the risk posed by a short circuit to a device, one or more switches would be opened to switch the device out of circuit. However the switching elements of voltage source converters, such as the voltage source converter 10 shown in FIG. 1, typically include anti-parallel diodes 14 that remain in conduction when the switching elements 12 are opened. Consequently, even when the switching elements 12 are opened, the diodes 14 allow the fault current 16 arising from a short circuit 18 in a DC network 20 connected to the voltage source converter 10 to flow continuously through the converter 10.

Another option for reducing the risk posed to a voltage source converter by a short circuit is to design the voltage source converter to tolerate the resultant fault current so that there is sufficient time to detect the fault and extinguish the current by opening a circuit breaker on the other, AC side of the voltage source converter.

However the fault current arising from a short circuit in a DC network connected to the voltage source converter is typically many times greater than the rated value of the converter. In order to increase the tolerance of the voltage source converter, either the size and capacity of conducting converter diodes must be increased, several converter diodes must be connected in parallel or a fast-acting bypass device must be incorporated that is capable of carrying the high fault current. In any case, whichever option is pursued, additional inductive components are almost certainly required to limit the high fault current and the increase in components leads to an increase in converter size and weight. This in turn leads to an increase in the size and area of the associated HVDC converter station.

In addition, opening a circuit breaker on the opposite, non-fault side of the voltage source converter is disadvantageous because it disconnects the other network from the HVDC power transmission network. Consequently after the fault is repaired, the converter station must go through a start-up sequence and a series of checks before the other network can be reconnected to the HVDC power transmission network. This leads to a prolonged interruption of power flow and therefore non-availability of the power transmission scheme to those dependent on the scheme for electrical power supply.

SUMMARY AND DESCRIPTION OF ASPECTS OF THE INVENTION

According to an aspect of the invention there is provided a voltage source converter for high voltage DC power transmission that is connectable, in use, between a DC network and another electrical network to interconnect the DC network and the other electrical network, the voltage source converter comprising a converter unit to convert power flowing between the DC network and the other electrical network and at least one fault unit including at least one fault module having a voltage source that is operable, in the event of a short circuit in the DC network, to produce a voltage that acts to reduce current flowing through the voltage source converter and the short circuit.

The provision of at least one fault unit including at least one fault module having a voltage source that is operable in this manner allows the voltage source converter to react quickly to a fault in a DC network connected to the voltage source converter with minimal operator involvement.

In addition the provision of the at least one fault module means that it is not necessary to open a circuit breaker on the non-fault side of the voltage source converter to disconnect the other, non-faulty, electrical network from the voltage source converter. Consequently, once the DC side fault is repaired, normal operation of the voltage source converter may be resumed without the need for a start-up sequence and series of checks.

The or each fault module preferably includes a voltage source that is operable to provide a voltage that is opposite in direction to a voltage of the other, non-faulty, electrical network connected to the voltage source converter.

The provision of a voltage that is opposite in direction to the voltage of the other, non-faulty, electrical network reduces the net voltage driving the fault current and therefore reduces the current flowing the voltage source converter and the short circuit.

In embodiments of the invention, the voltage source converter may include a chain of fault modules connected in series in the form of a chain-link converter.

A chain of fault modules connected in series in the form of a chain-link converter provides a stepped variable voltage source that permits the generation of a voltage built up from the voltages provided by each of the individual fault modules. This is particularly advantageous in situations in which the voltage of the other, non-faulty, electrical network exceeds the voltage available from each individual fault module.

The or each fault module preferably includes a voltage source in the form of an energy storage device and at least one semiconductor switch to switch the energy storage device in and out of circuit.

Such an arrangement allows the or each fault module to provide a voltage via a respective energy storage device that is capable of storing and releasing energy. The use of one or more semiconductor switches allows the energy storage device to be switched in and out of circuit, as required, so that in the event of a fault in the DC network the energy storage device of the or each fault module may be switched into circuit to provide a voltage to oppose the driving voltage of the other, non-faulty, electrical network.

The energy storage device of the or each fault module may be connected with two pairs of semiconductor switches in a full-bridge arrangement to form a 4-quadrant bipolar fault module that can provide positive, zero or negative voltage and can conduct current in both directions.

The use of one or more 4-quadrant bipolar fault modules maximizes the flexibility of the voltage source converter whilst simplifying its design. This is because the bidirectional characteristic of the full-bridge arrangement allows the or each fault module to be used to oppose either an AC driving voltage or a DC driving voltage. The use of one or more 4-quadrant bipolar fault modules therefore renders the voltage source converter suitable for use in an HVDC transmission network in which it is necessary to interconnect and AC network and a DC network or two DC networks.

In other embodiments the energy storage device of the or each fault module may be connected with a pair of semiconductor switches in a half-bridge arrangement to form a 2-quadrant unipolar fault module that can provide positive or zero voltage and can conduct current in both directions.

The use of one or more 2-quadrant unipolar fault modules is advantageous in embodiments in which the or each fault module is only required to provide a unidirectional voltage. This is because it results in a reduced converter size having fewer components than a converter having one or more 4-quadrant bipolar fault modules and thereby reduces the overall cost of the voltage source converter.

In yet further embodiments, the or each fault modules may be simplified and may include an energy storage device connected with at least one semiconductor switch and at least one diode so that the energy storage device is connectable via the or each diode when the or each semiconductor switch is operated.

The energy storage device of the or each fault module may be provided in the form of a capacitor, battery, fuel cell or auxiliary AC generator with an associated rectifier.

In embodiments in which the energy storage of the or each module is provided in the form of a capacitor, the capacitor may be charged to store energy and, when required, discharged to provide a voltage step.

In embodiments in which the energy storage device of the or each fault module is provided in the form of a power source, such as a battery, fuel cell, photovoltaic cell or AC generator rectified source, power is transferred into or out of the energy storage device as required.

Preferably the or each semiconductor switch of the or each fault module is provided in the form of an insulated gate bipolar transistor, field effect transistor or gate turn-off thyristor, each with a reverse parallel diode connected across its terminals. Such devices are small in size and weight, and have low power dissipation, which minimizes the need for cooling equipment. Their use therefore leads to significant reductions in power converter cost, size and weight.

In embodiments of the invention, the converter unit may include at least one phase element having a plurality of semiconductor switches, the or each phase element having an AC terminal located at its mid-point for connection, in use, to an AC network and opposite ends of the or each phase element being connected to respective DC terminals for connection, in use to a DC network.

Such a construction of converter unit renders the voltage source converter suitable for use in connecting an AC network and a DC network.

In embodiments where the voltage source converter is intended to be used to connect a multi-phase AC network and a DC network, the converter unit may include a plurality phase elements connected in parallel, each of the phase elements having an AC terminal at its mid-point for connection, in use, to a respective phase of an AC network. In such embodiments, opposite ends of each phase element are connected to respective DC terminals for connection, in use, to the DC network.

The construction of the voltage source converter is variable in terms of the location of the or each fault unit relative to the converter unit in order to oppose, in use, the driving voltage of the AC network in the event of a fault in the DC network.

For example, in one embodiment, a respective fault unit may be connected to the AC terminal of the or each phase element for connection, in use, between the phase element and the AC network.

In another embodiment, a fault unit may be connected to one of the DC terminals for connection, in use, between one end of the or each phase element and the DC network.

It is also envisaged that in embodiments of the invention the converter unit and a fault unit may be formed as an integrated unit. In such embodiments the fault unit may enhance the operation and/or the performance of the converter.

The integrated unit preferably includes at least one phase element having first and second limbs connected in series and an AC terminal at its mid-point, between the first and second limbs, for connection, in use, to an AC network. Each limb preferably includes a chain of integrated modules connected in series, each of the integrated modules including an energy storage device connected in parallel with at least one pair of semiconductor switches. Opposite ends of the or each phase element are preferably connected to respective DC terminals for connection, in use, to a DC network.

In such embodiments, each of the integrated modules may include an energy storage device connected with either two pairs of semiconductor switches in a full-bridge arrangement to define a 4-quadrant bipolar integrated module, or a pair of semiconductor switches in a half-bridge arrangement to define a 2-quadrant unipolar integrated module.

As with the fault modules, and resulting in corresponding advantages, the energy storage device of the or each integrated module may be provided in the form of a capacitor, battery, fuel cell or auxiliary AC generator with an associated rectifier, and each semiconductor switch may be provided in the form of an insulated gate bipolar transistor, field effect transistor or gate turn-off thyristor, each with a reverse parallel diode connected across its terminals.

Preferably the voltage source converter is operable, in use, to exchange reactive power with an AC network connected to the converter.

Preferred embodiments of the invention will now be described, by way of non-limiting examples, with reference to the accompanying drawings in which:

DETAILED DESCRIPTION

While the present invention is described herein in connection with certain embodiments, it is to be understood that the invention is not limited to the disclosed embodiments, but, on the contrary, is intended to cover various modifications and equivalent arrangements included within the spirit and scope of the appended claims, and equivalents thereof.

Figure 1:
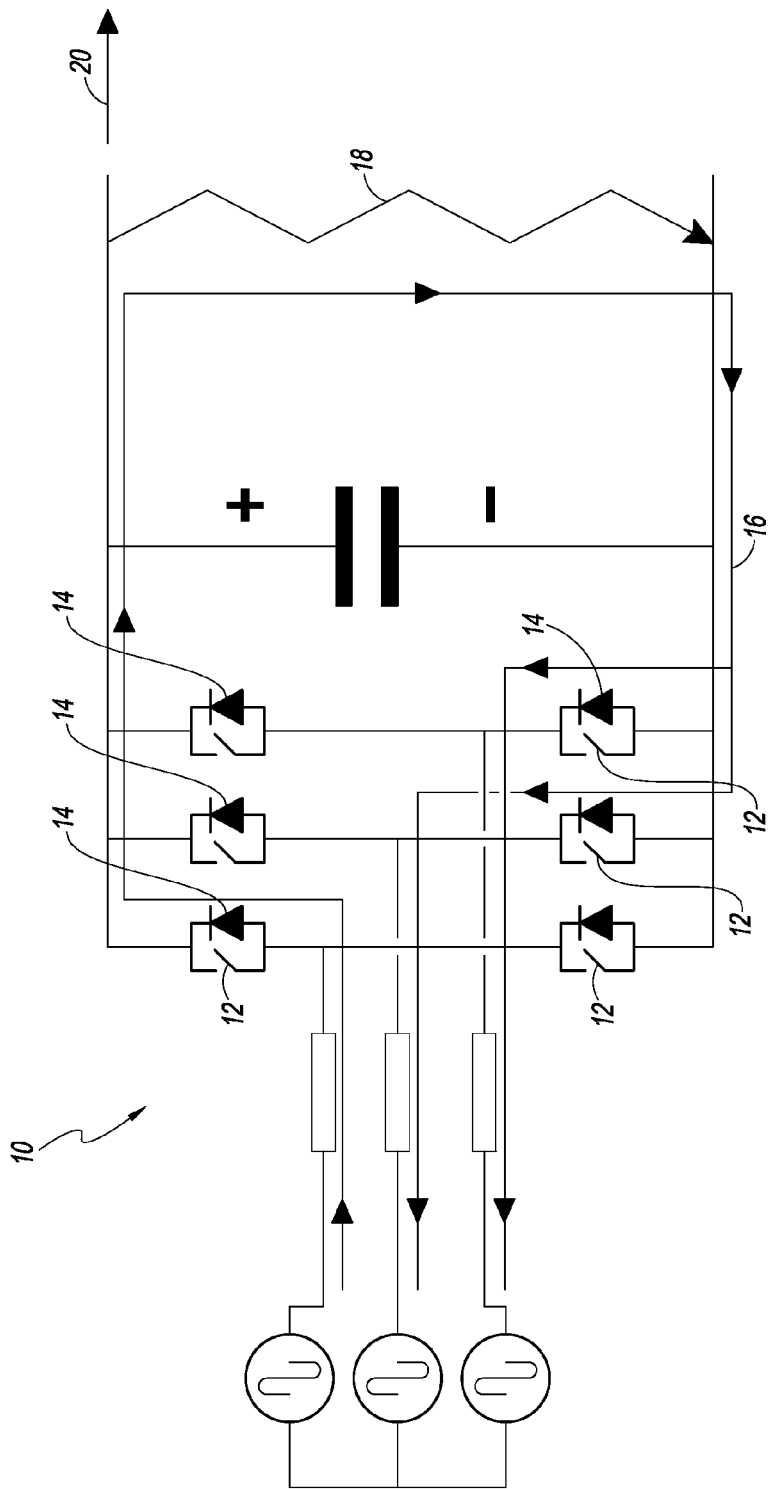
FIG. 1 shows the flow of current in a voltage source converter via diode conduction in the event of a fault in a DC network connected to the voltage source converter.
Figure 2A:
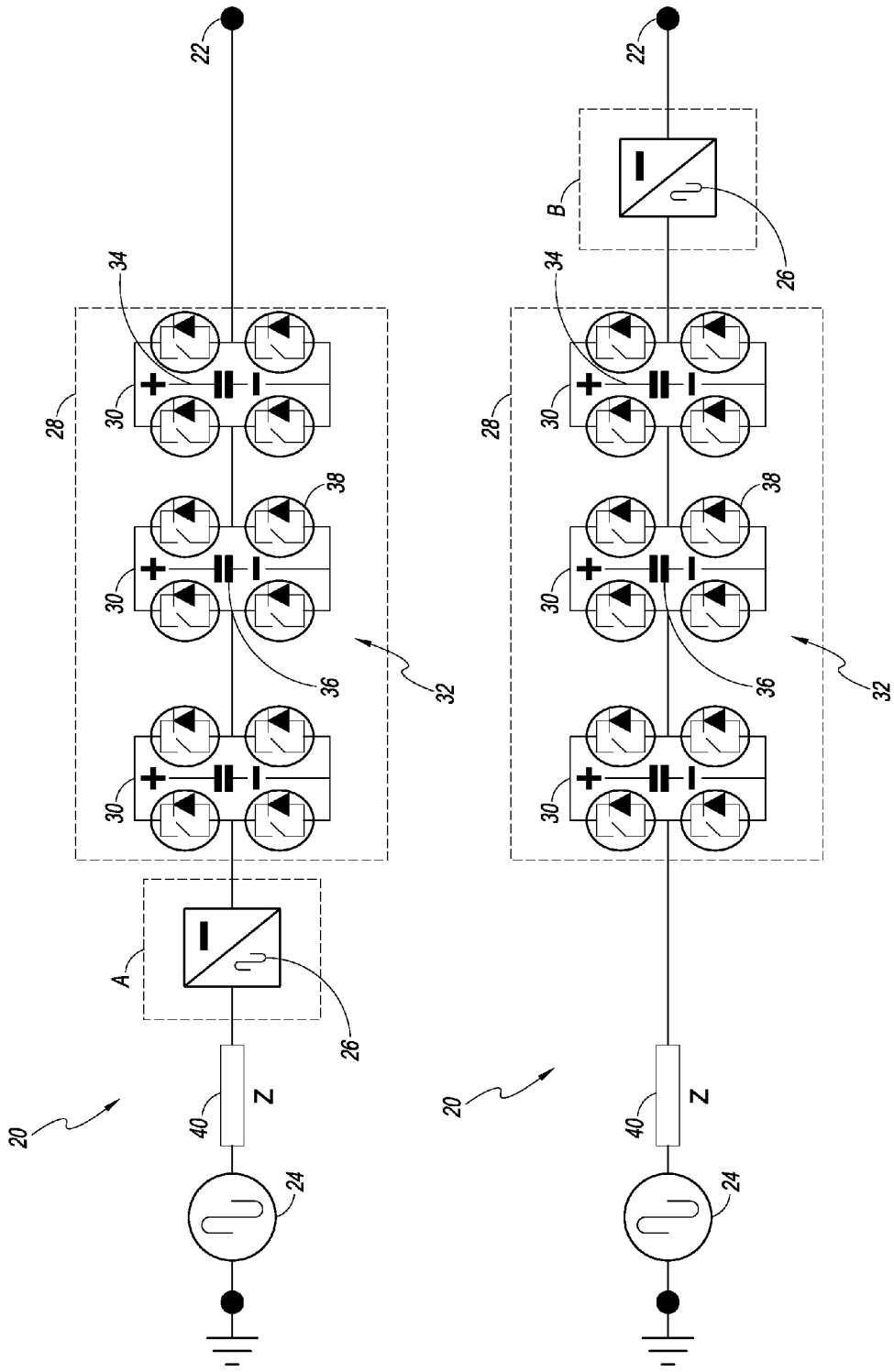
FIGS. 2a and 2b show a voltage source converter according to an embodiment of the invention.
Figure 2B:
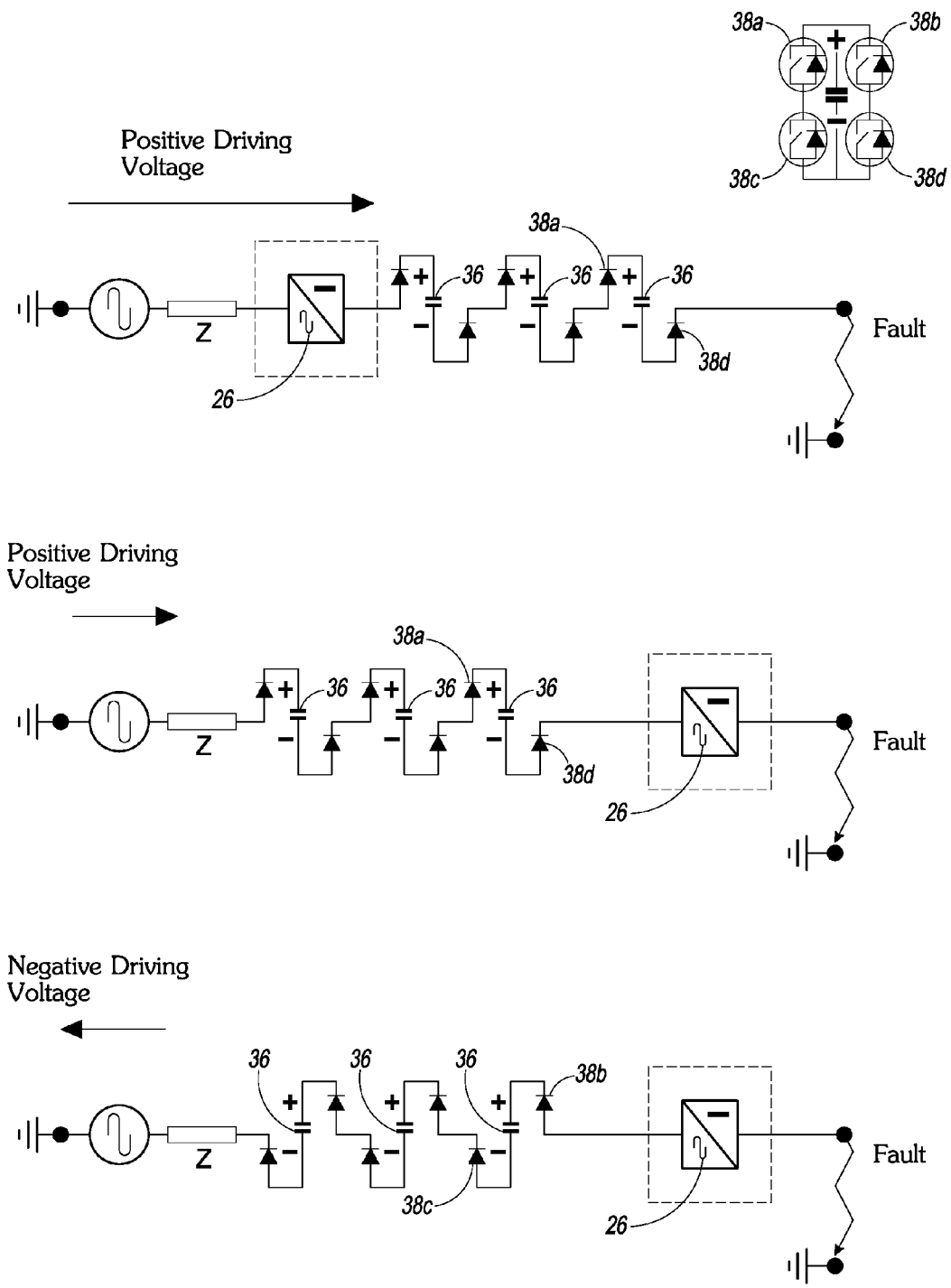

A voltage source converter 20 according to an embodiment of the invention is shown in FIGS. 2a and 2b connected in an HVDC power transmission network between a DC network 22 and an AC network 24 so as to interconnect the DC and AC networks 22,24. The voltage source converter 20 includes a converter unit 26 to convert power flowing between the DC network 22 and the AC network 24 and a fault unit 28.

The fault unit 28 includes a plurality of fault modules 30 connected in series to form a chain-link converter 32 connected with the converter unit 26 between the DC and AC networks 22,24, each of the fault modules including a voltage source 34.

In operation of the HVDC power transmission network, the DC network 22 may experience a DC side fault presenting a short circuit across the DC transmission lines or cables, which may be less than a few Ohms. During such a fault condition, the voltage source converter 20 remains connected to the other, non-faulty AC network 24, which continues to provide a driving voltage and results in a fault current flowing through the voltage source converter 20 and the short circuit.

The voltage source 34 of each of the fault modules 30 of the chain-link converter 32 is operable, as required, during the fault condition to produce a voltage to oppose the driving voltage of the non-faulty AC network 24, and thereby reduce the net voltage driving the fault current through the voltage source converter 20 and the short circuit.

In the embodiment shown in FIGS. 2a and 2b, the voltage source 34 of each of the fault modules 30 of the chain-link converter 32 is provided in the form of a capacitor 36, which is connected with two pairs of semiconductor switches 38 in a full-bridge arrangement to form a 4-quadrant bipolar fault module.

Each of the semiconductor switches 38 includes an insulated gate bipolar transistor accompanied by a reverse-parallel connected diode.

In other embodiments, it is envisaged that each of the semiconductor switches 38 may include a different semiconductor switch, such as a gate turn-off thyristor, a field-effect transistor or an integrated gate-commutated thyristor, accompanied by a reverse-parallel connected diode.

During a fault condition, the capacitor 36 of a fault module 30 may be bypassed or inserted into the chain-link converter 32 by changing the state of the semiconductor switches 38.

A capacitor 36 of a fault module 30 is bypassed when a pair of semiconductor switches 38 is configured to form a short circuit in the fault module 30, causing the current in the fault module 30 to pass through the short circuit and bypass the capacitor 36.

In many fault conditions, the current flows only in the reverse-parallel connected diodes of the semiconductor switches 38. In these instances, the semiconductor switches 38 may be turned off to achieve insertion of the capacitors 36.

A capacitor 36 of a fault module 30 is inserted into the chain-link converter 32 when the pair of semiconductor switches 38 is configured to allow the current to flow into and out of the capacitor 36, which is then able to charge or to discharge its stored energy and provide a voltage.

It is therefore possible to build up a combined voltage across the chain-link converter 32, which is higher than the voltage available from each of the individual fault modules 30, via the insertion of the capacitors 36 of multiple fault modules 32, each providing its own voltage, into the chain-link converter 32.

It is also possible to vary the timing of switching operations for each fault module 30 such that the insertion and/or bypass of the capacitors 36 of individual fault modules 30 in the chain-link converter 32 results in the generation of a voltage waveform to oppose the voltage waveform of the non-faulty AC network 24.

The state of the semiconductor switches 38 of each fault module 30 determines the path of current through the fault module 30 and therefore the voltage provide by the fault module 30.

More specifically, the fault module 30 provides zero voltage when the capacitor 36 is bypassed by either closing semiconductor switches 38a and 38b, or closing semiconductor switches 38c and 38d.

The fault module 30 provides positive voltage for both directions of current flow when semiconductor switches 38a and 38d are closed and semiconductor switches 38b and 38c are open so that current flows via semiconductor switches 38a and 38d into and out of the capacitor 36.

The fault module 30 provides negative voltage for both directions of current flow when semiconductor switches 38b and 38c are closed and semiconductor switches 38a and 38d are open so that current flows via semiconductor switches 38b and 38c into and out of the capacitor 36.

The number of fault modules 30 inserted into the chain-link converter 32 and the direction of the voltage produced by the inserted modules 30 is determined by the voltage required to oppose the driving voltage of the non-faulty AC network 24.

In the absence of any fault in the DC network 22, the semiconductor switches 38 are configured so that the capacitor 36 of each fault module 30 may be bypassed or temporarily inserted to enable charging. Alternatively the fault module 30 may be operated to enhance the operation and/or performance of the voltage source converter 20.

The fault unit 28 may be provided on either the AC side or the DC side of the converter unit 26, as illustrated in FIGS. 2a and 2b by the two alternative positions A and B of the converter unit 26. In either configuration, the AC network 24 is connected to the voltage source converter via one or more inductors 40.

Figure 3:
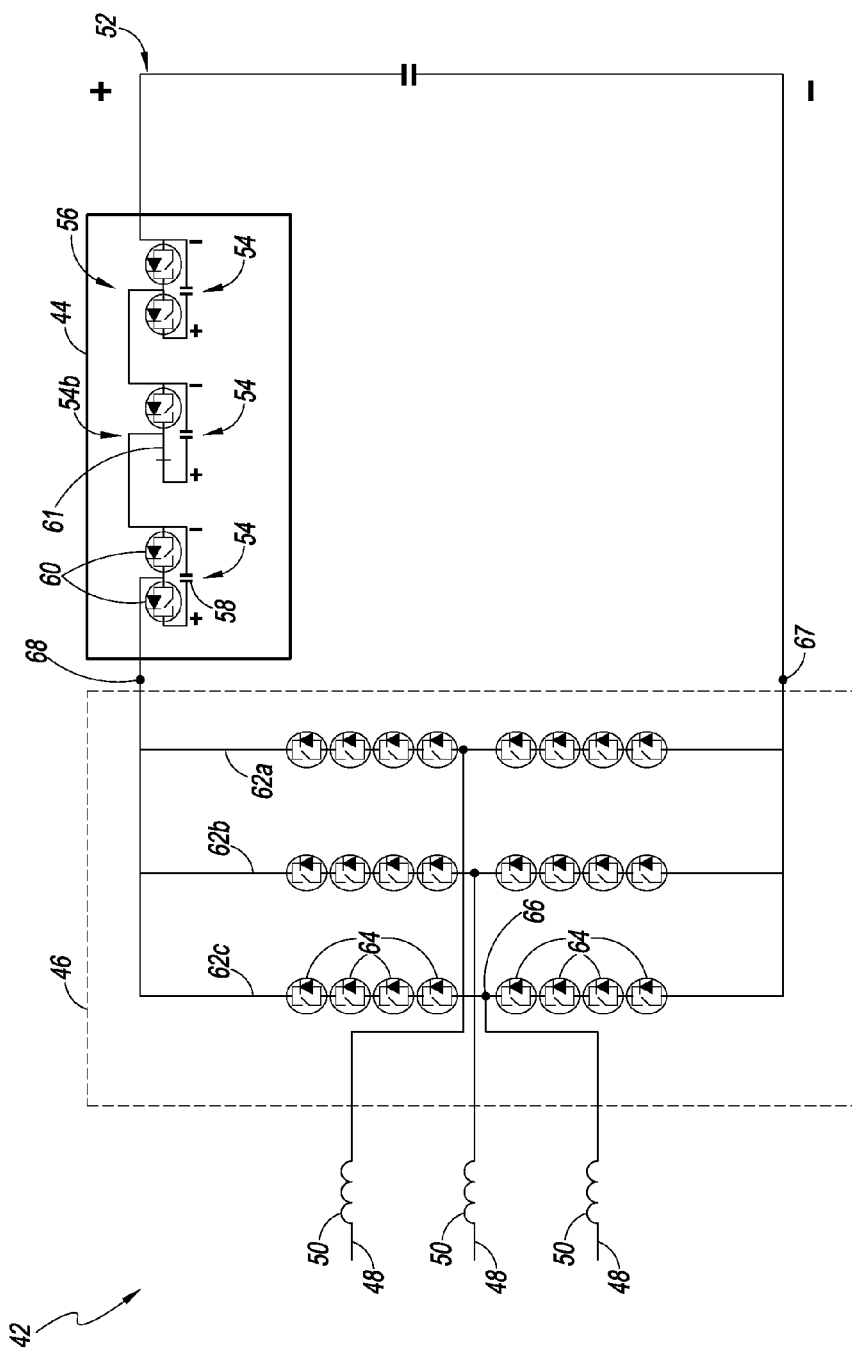
FIG. 3 shows a voltage source converter according to another embodiment of the invention.

A voltage source converter 42 according to an embodiment of the invention in which a fault unit 44 is connected to the DC side of a converter unit 46 is shown in FIG. 3. The converter unit 46 is connected to an AC network 48 on its AC side via inductors 50 and connected on its DC side via the fault unit 44 to the DC network 52.

As in the embodiment shown in FIGS. 2a and 2b, the fault unit 44 of the voltage source converter 42 shown in FIG. 3 includes a chain of fault modules 54 in the form of a chain-link converter 56. Each of the fault modules 54 however includes a capacitor 58 connected with a pair of semi-conductor switches 60 in a half-bridge arrangement to form a 2-quadrant unipolar fault module.

Such a configuration of fault unit 44 is possible because the fault unit 44 is connected to the DC side of the converter unit 46. Consequently it is only necessary for the fault unit 44 to provide positive or zero voltage in order to oppose the driving voltage of the AC network 48 in the event of a fault in the DC network 52.

While the fault modules 54 of the fault unit 44 are provided in the form of 2-quadrant unipolar fault modules, their operation in the event of a fault in the DC network 52 is essentially the same as that described with reference to FIGS. 2a and 2b in that the semiconductor switches 60 are configured to insert or bypass the capacitor 58 of each fault module 54, as required, in order to provide the voltage required to oppose the driving voltage of the AC network 48.

The or each 2-quadrant module 54 may be simplified further by replacing the upper semiconductor switch 60 with a diode 61, as shown in the middle module 54b of the fault unit 44.

In other embodiments, the fault unit 44 may include one or more 4-quadrant modules.

In the absence of any fault in the DC network 52, the semiconductor switches 60 are configured so that the capacitor 58 of each fault module 54 is bypassed or temporarily inserted to enable charging of the capacitor 58. Alternatively each fault module 54 may be operated to enhance the operation and/or performance of the voltage source converter 42.

Referring to FIG. 3, it can be seen that the converter unit 46 of the voltage source converter 42 includes three phase elements 62a,62b,62c connected in parallel.

Each of the phase elements 62a,62b,62c includes a plurality of semiconductor switches 64 and an AC terminal 66 located at its mid-point via which the phase element 62a, 62b,62c is connected to a respective phase of the AC network 48.

Opposite ends of the phase elements are connected to respective DC terminals 67,68 via which the converter unit 46 is connected to the DC network 52.

Switching of the semiconductor switches 64 of the phase elements 62a,62b,62c is controlled to facilitate the required conversion between AC and DC power.

In the embodiment shown in FIG. 3, each of the semiconductor switches 60,64 in each of the fault modules 54 and each of the phase elements 62a,62b,62c, includes an insulated gate bipolar transistor accompanied by a reverse-parallel connected diode.

In other embodiments it is envisaged that each of these semiconductor switches 60,64 may include a different semiconductor switch, such as a gate turn-off thyristor, a field-effect transistor or an integrated gate-commutated thyristor, accompanied by a reverse-parallel connected diode.

In other embodiments it is also envisaged that the number of phase elements 62 included in the converter unit 46 may be varied to accommodate AC networks having different numbers of phases.

Figure 4:
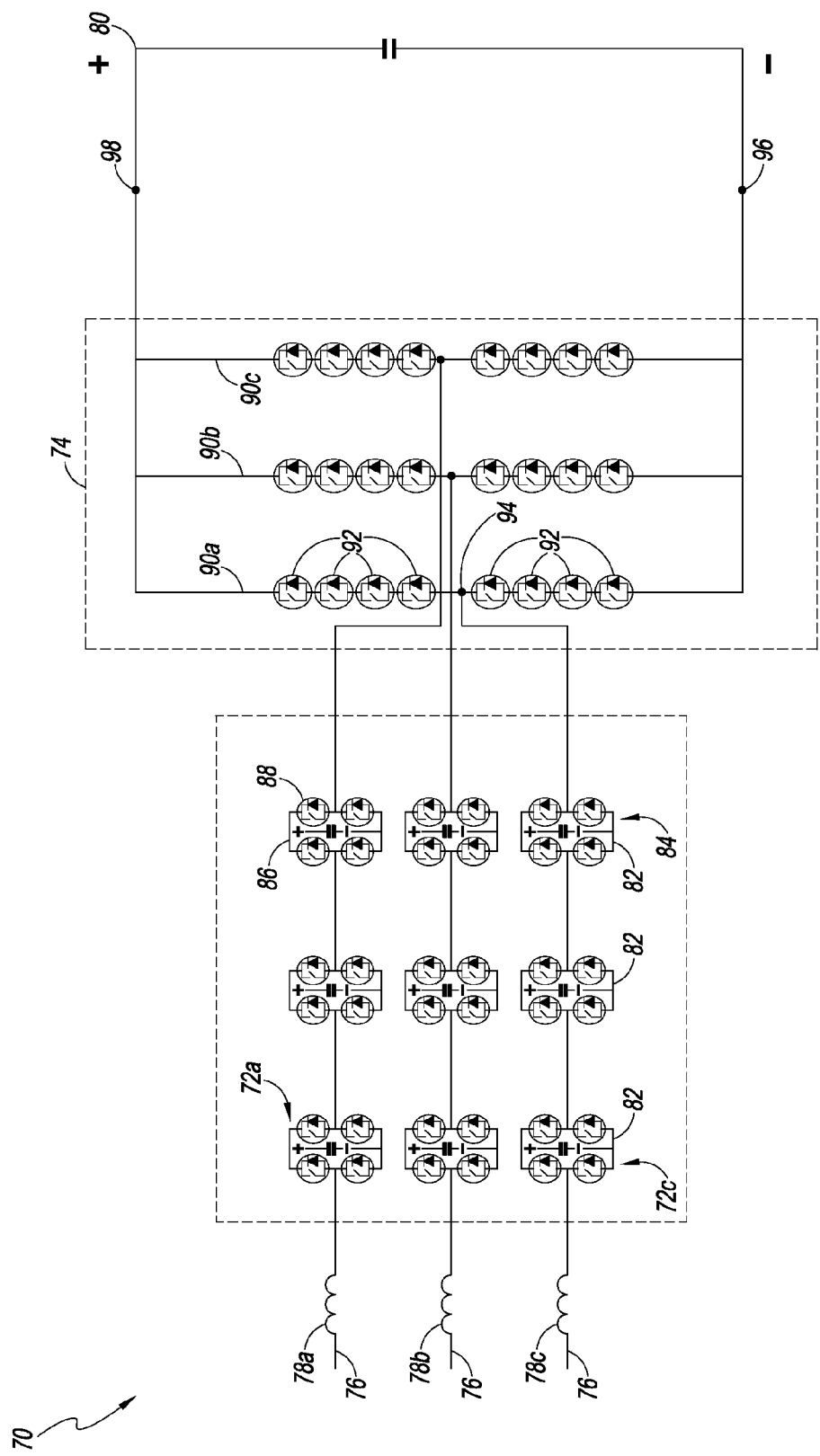
FIG. 4 shows a voltage source converter according to a further embodiment of the invention.

A voltage source converter 70 according to an embodiment of the invention in which a fault unit is connected to the AC side of a converter unit 74 is shown in FIG. 4.

Referring to FIG. 4, it can be seen the converter unit 74 of the voltage source converter 70 is connected on its AC side to an AC network 76 via three fault units 72a,72b,72c and three respective inductors 78a,78b,78c. The converter unit 74 is connected on its DC side directly to a DC network 80.

Each of the fault units 72a,72b,72c includes a chain of fault modules 82 in the form of a chain-link converter 84, and each of the fault modules 82 includes a capacitor 86 connected with two pairs of semi-conductor switches 88 in a full-bridge arrangement to form a 4-quadrant bipolar fault module.

Such a configuration of fault unit 72 is required because the fault units 72a,72b,72c are connected to the AC side of the converter unit 74. Consequently it is necessary for each of the fault units 72a,72b,72c to provide positive, zero or negative voltage in order to oppose the driving voltage of the AC network 76 in the event of a fault in the DC network 80.

As in the embodiment shown in FIG. 3, the converter unit 74 of the voltage source converter 70 includes three phase elements 90a,90b,90c connected in parallel.

Each of the phase elements 90a,90b,90c includes a plurality of semiconductor switches 92 and an AC terminal 94 located at its mid-point via which the phase element 90a, 90b,90c is connected via a respective one of the fault units 72a,72b,72c, to a respective phase of the AC network 76.

Opposite ends of the phase elements 90a,90b,90c are connected to respective DC terminals 96,98 via which the converter unit 74 is connected to the DC network 80.

Switching of the semiconductor switches 92 of the phase elements 90a,90b,90c is controlled to facilitate the required conversion between AC and DC power.

As outlined with reference to FIGS. 2a and 2b, the semiconductor switches 88 of the fault modules 82 of the chain-link converters 84 of each of the fault units 72a,72b, 72c are configured to insert or bypass the capacitor 86 of each fault module 82, as required, in order to provide the voltages required to oppose the driving voltage of each phase of the AC network 76.

In the absence of any fault in the DC network 80, the semiconductor switches 88 are configured so that the capacitor 86 of each fault module 82 is bypassed or temporarily inserted to permit charging of the capacitor 86. Alternatively the fault module 82 may be operated to enhance the operation and/or performance of the voltage source converter 70.

In the embodiment shown in FIG. 4, each of the semiconductor switches 88,92 in each of the fault modules 82 and each of the phase elements 90a,90b,90c, includes an insulated gate bipolar transistor accompanied by a reverse-parallel connected diode.

In other embodiments it is envisaged that each of these semiconductor switches 88,92 may include a different semiconductor switch, such as a gate turn-off thyristor or an integrated gate-commutated thyristor, accompanied by a reverse-parallel connected diode.

In other embodiments it is also envisaged that the number of phase elements 90 included in the converter unit 74 may be varied to accommodate AC networks having different numbers of phases.

Figure 5:
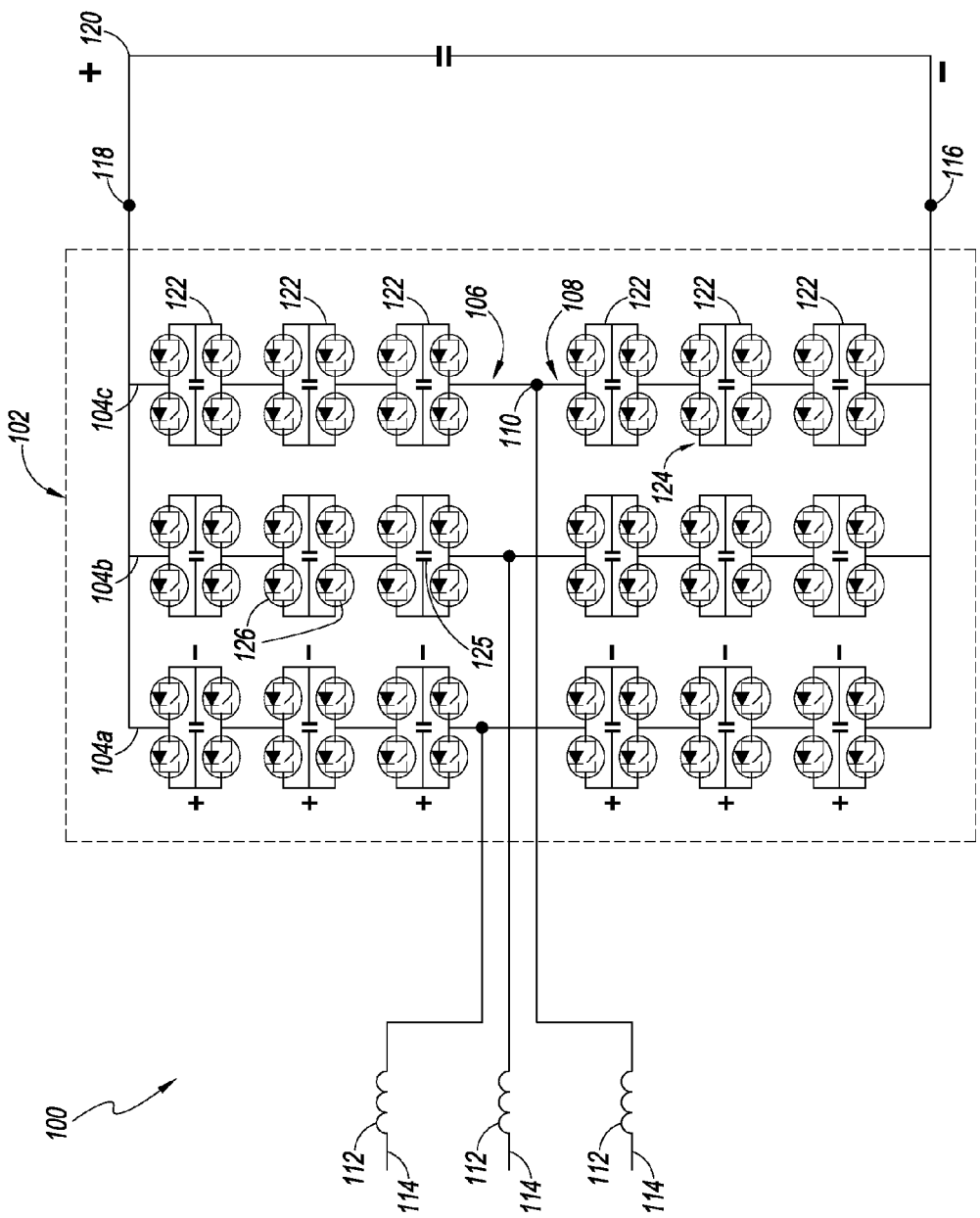
FIG. 5 shows a voltage source converter according to a yet further embodiment of the invention.

A voltage source converter 100 according to a further embodiment of the invention is shown in FIG. 5 in which the functions of the converter units and the fault units of the previous embodiments are provided by an integrated unit 102.

The integrated unit 102 includes three phase elements 104a,104b,104c, connected in parallel. Each of the phase elements 104a,104b,104c has first and second limbs 106,108 connected in series and an AC terminal 110 provided at its mid-point between the first and second limbs 106,108 via which each of the phase elements 104a,104b,104c is connected via a respective inductor 112 to an AC network 114.

Opposite ends of the phase elements 104a,104b,104c are connected to respective DC terminals 116,118 via which the integrated unit 102 is connected to a DC network 120.

Each limb 106,108 of each of the phase elements 104a, 104b,104c includes a chain of integrated modules 122 connected in series to form a chain-link converter 124. In the embodiment shown in FIG. 5, each of the integrated modules 122 includes a capacitor 125 connected with two pairs of semiconductor switches 126 in a full-bridge arrangement to define a 4-quadrant bipolar integrated module.

In the absence of any fault in the DC network, the semi-conductor switches 126 of the integrated modules 122 are operated to effect the required conversion between AC and DC power for each phase of the AC network 114.

During a fault condition, the semi-conductor switches 126 of the integrated modules 122 are operated to insert or bypass each of the capacitors 125 of the integrated modules 122, as required, to provide the voltage required to oppose the driving voltage of each phase of the AC network 114.

In the embodiment shown in FIG. 5 each of the semiconductor switches 126 in each of the integrated modules 122 includes an insulated gate bipolar transistor accompanied by a reverse-parallel connected diode.

In other embodiments it is envisaged that each of the semiconductor switches 122 may include a different semiconductor switch, such as a gate turn-off thyristor or an integrated gate-commutated thyristor, accompanied by a reverse-parallel connected diode.

In other embodiments it is also envisaged that the number of phase elements 104 included in the integrated unit 102 may be varied to accommodate AC networks having different numbers of phases.

It is also envisaged that in other embodiments a voltage source converter according to the invention may be used to interconnect two DC networks. A DC to DC converter 128 according to such an embodiment is shown in FIG. 6.

The DC to DC converter 128 includes a plurality of 4-quadrant chain-link fault modules 130, which are connected in series to form a fault unit in the form of a series voltage source converter 136 connected between one DC network 132 and another DC network 134.

The switches within each fault module 130 are operable to insert or bypass the respective capacitor 138 and provide a controllable, bidirectional voltage in the event of a fault in one of the DC networks 132,134 to oppose the driving voltage of the other, non-faulty DC network.

Figure 6:
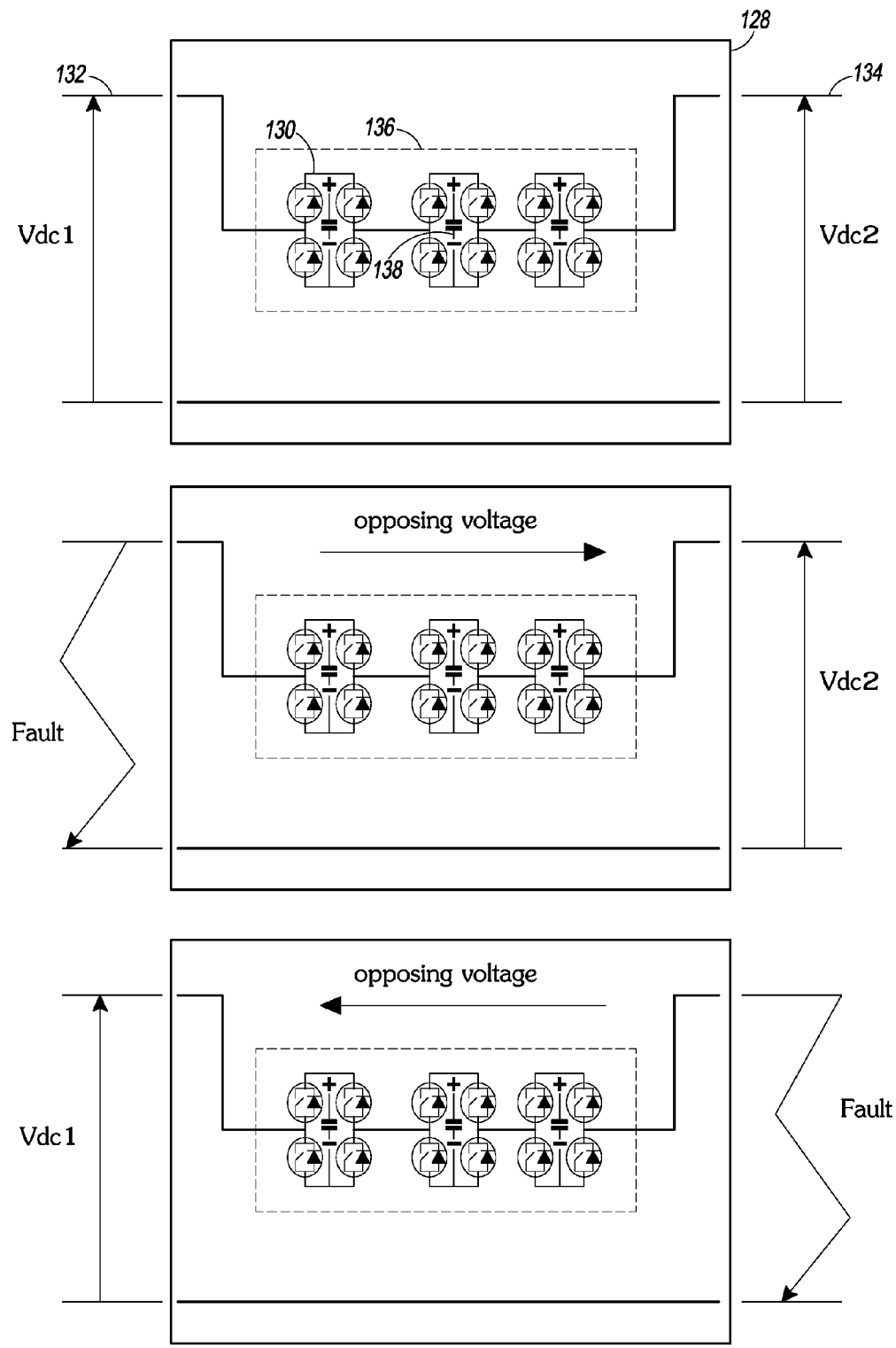
FIG. 6 shows a DC current-carrying chain-link converter providing a voltage to oppose a DC driving voltage to reduce a fault current.

In such an embodiment it is envisaged that the voltage source converter 136 may be configured to oppose a driving voltage arising from either of the DC networks 132,134 and therefore provide a fault unit that is responsive to handle a fault regardless of in which DC network 132,134 the fault arises, as shown in FIG. 6.

In the absence of any fault in either of the DC networks 132,134, the series voltage source converter 136 may be required to provide a voltage equal to the difference between the voltage of the one DC network 132 and that of the other DC network 134, and therefore forms an inherent part of the overall DC to DC converter 128.

In other embodiments, the fault unit may be designed to be responsive to faults in only one of the DC networks, and is therefore only required to develop an opposing voltage in one direction. In such embodiments, the fault unit provided in the form of the voltage source converter 136 may include a plurality of 2-quadrant modules.

What is claimed is:

1. A voltage source converter for high voltage DC power transmission that is configured to be connectable, in use, between a DC network and an AC network to interconnect the DC network and the AC network, the voltage source converter comprising:
a converter unit to convert power flowing between the DC network and the AC network, the converter unit including at least one phase element having a plurality of semiconductor switches, the at least one phase element having an AC terminal located at its mid-point and configured to be connected, in use, to the AC network and opposite ends of the at least one phase element being respectively connected to a first DC terminal and a second DC terminal;
a fault unit connected to the first DC terminal to interconnect, in use, the converter unit and the DC network, and no fault unit connected to the second DC terminal, wherein the fault unit connected to the first DC terminal includes at least one fault module, wherein the at least one fault module includes a voltage source in the form of an energy storage device and at least one semiconductor switch, wherein in response to a short circuit in the DC network, the at least one semiconductor switch of the at least one fault module is configured to insert or bypass the voltage source of the at least one fault module, to provide the voltage required to oppose the driving voltage of the AC network and thereby reduce current flowing through the voltage source converter and the short circuit.

2. The voltage source converter according to claim 1, wherein the voltage source of the at least one fault module is configured to produce a voltage having an opposite polarity to a voltage of the AC network.

3. The voltage source converter according to claim 1, wherein the fault unit connected to the first DC terminal includes a plurality of fault modules connected in series in the form of a chain-link converter.

4. The voltage source converter according to claim 1, wherein the at least one fault module includes the energy storage device connected with two pairs of semiconductor switches in a full-bridge arrangement to form a 4-quadrant bipolar fault module.

5. The voltage source converter according to claim 1, wherein the at least one fault module includes the energy storage device connected with a pair of semiconductor switches in a half-bridge arrangement to form a 2-quadrant unipolar fault module.

6. The voltage source converter according to claim 1, wherein the at least one fault module includes the energy storage device connected with the at least one semiconductor switch and at least one diode so that the energy storage device is connectable via the at least one diode when the at least one semiconductor switch is operated.

7. The voltage source converter according to claim 1, wherein the converter unit includes a plurality of phase elements connected in parallel, each of the phase elements having the AC terminal at its mid-point configured to be connected, in use, to a respective phase of the AC network.

8. The voltage source converter according to claim 1, wherein the energy storage device is provided in the form of a capacitor or a battery.

9. The voltage source converter according to claim 1, wherein the at least one semiconductor switch of the at least one fault module includes an insulated gate bipolar transistor, a field effect transistor or a gate turn-off thyristor, each with a reverse parallel diode connected across its terminals.

10. The voltage source converter according to claim 1, wherein the voltage source converter is configured to, in use, exchange reactive power with the AC network connected to the converter.

* * * * *